G. T. RANDOL.
MECHANICAL GEAR SHIFT.
APPLICATION FILED SEPT. 14, 1920.
1,419,518.
Patented June 13, 1922.
4 SHEETS—SHEET 1.
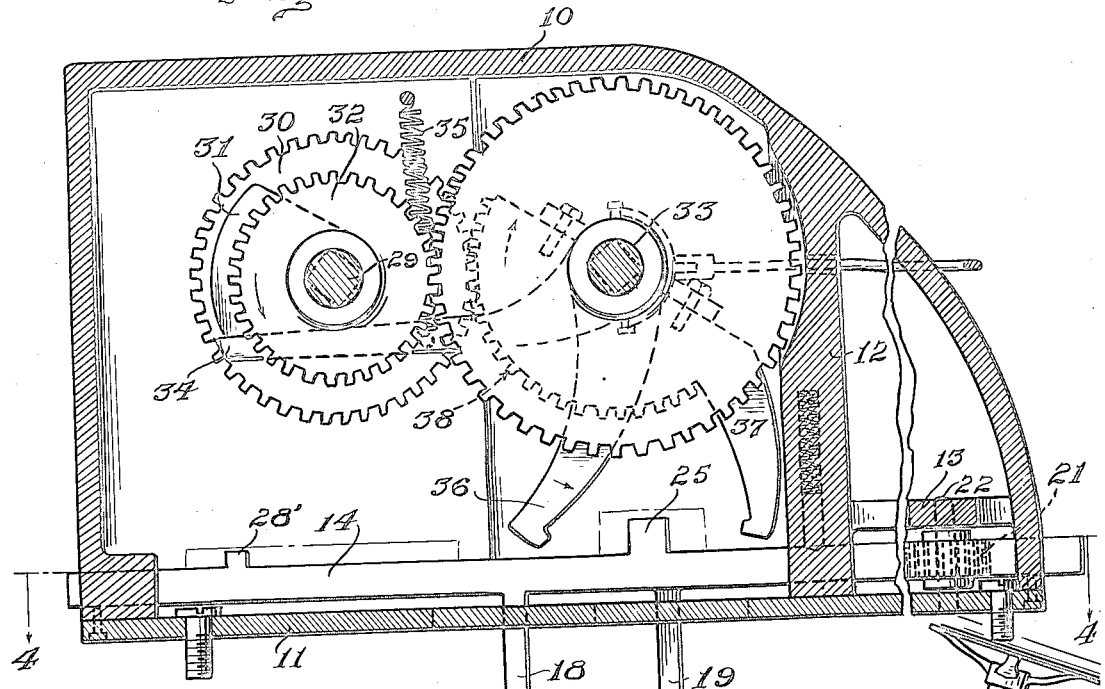
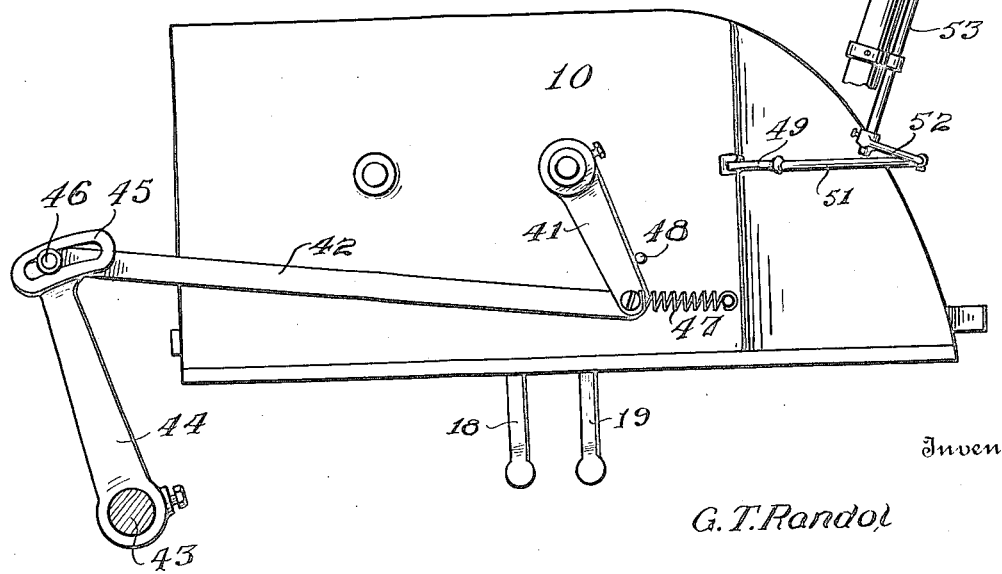
Inventor
G. T. Randol
By Lacey & Lacey, Attorneys

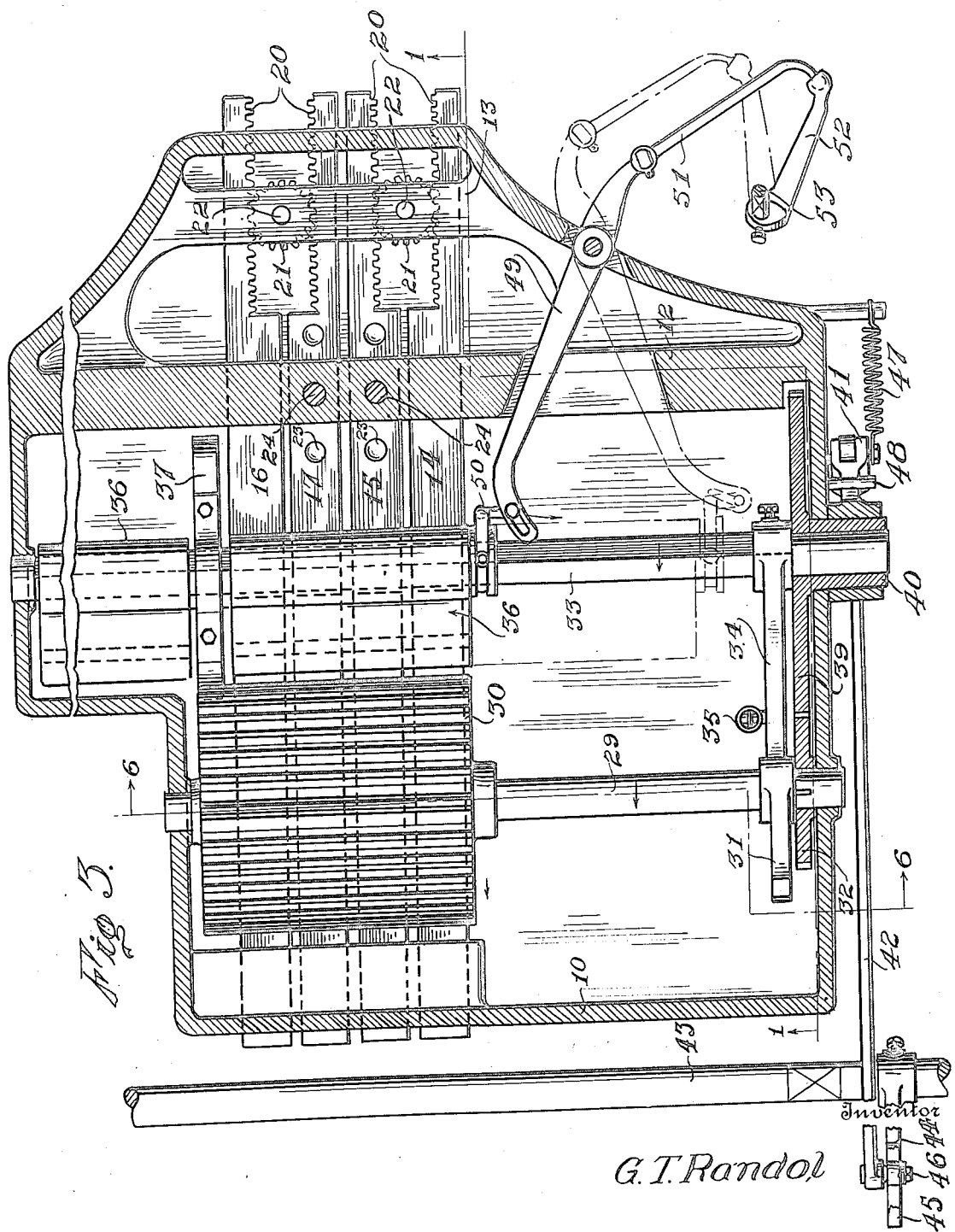

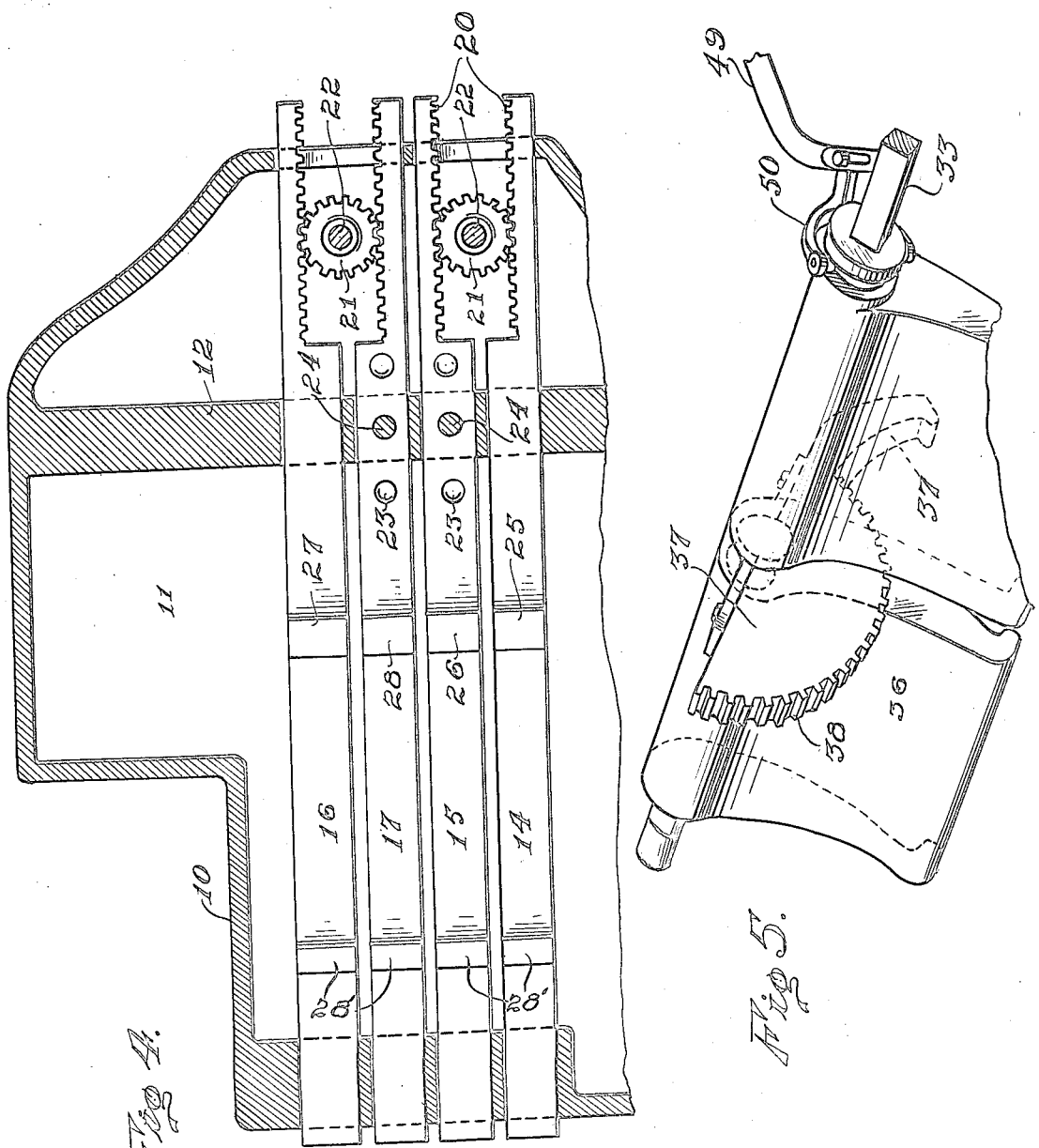

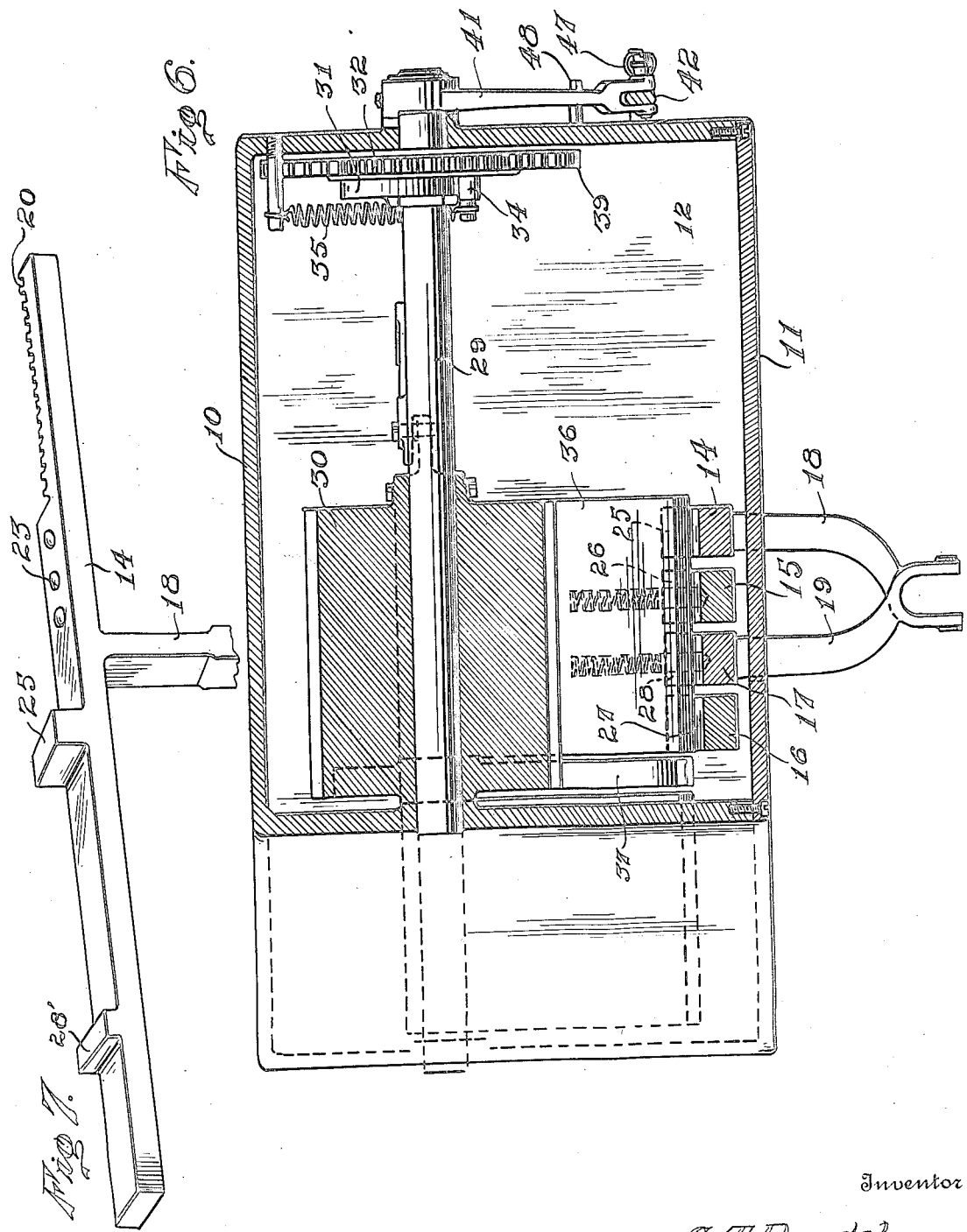

UNITED STATES PATENT OFFICE.

GLENN T. RANDOL, OF MARMADUKE, ARKANSAS, ASSIGNOR OF FIFTY PER CENT TO SOL S. STEINBERG, OF PARAGOULD, ARKANSAS.

MECHANICAL GEAR SHIFT.

1,419,518. Specification of Letters Patent. Patented June 13, 1922.

Application filed September 14, 1920. Serial No. 410,185.

*To all whom it may concern:*

Be it known that I, GLENN T. RANDOL, a citizen of the United States, residing at Marmaduke, in the county of Greene and State of Arkansas, have invented certain new and useful Improvements in Mechanical Gear Shifts, of which the following is a specification.

This invention relates to an improved mechanical gear shift for motor vehicles and has as one of its principal objects to provide a mechanism whereby the speed gears of a vehicle may be shifted when the vehicle clutch pedal is operated.

A further object of the invention is to provide a mechanism wherein the work of shifting the speed gears will be performed by manual pressure against the clutch pedal so that the movement of the gears will be sure and positive.

The invention has, as a further object to provide a mechanism wherein any desired gear may be readily selected and wherein any gear previously active will, before any of the other gears are shifted to active position, be moved or returned to its neutral position so that no two gears will be active at the same time.

A still further object of the invention is to provide a mechanism wherein the vehicle clutch may be released without shifting any of the gears so that the vehicle may be allowed to stand with the engine running even though one of the speed gears is active.

And the invention has as a still further object to provide a mechanism which may be readily employed in connection with substantially any conventional design of motor vehicle.

Other and incidental objects will appear hereinafter.

In the drawings:

Figure 1 is a vertical sectional view of my improved mechanism taken on the line 1—1 of Figure 3, looking in the direction of the arrows, Figure 2 is a side elevation of the mechanism, Figure 3 is a horizontal sectional view of the mechanism, Figure 4 is a section taken on the line 4—4 of Figure 1, looking in the direction of the arrows, Figure 5 is a detail perspective view of the selector and neutral shift member employed, Figure 6 is a transverse section on the line 6—6 of Figure 3, looking in the direction of the arrows, and Figure 7 is a detail perspective view of one of the gear shift rods employed.

In carrying the invention into effect, I employ a casing 10 which, as particularly shown in Figures 3 and 4 of the drawings, is laterally enlarged at its rear end portion and is closed at its lower side by a plate 11. The casing is formed to be mounted upon the transmission case of a motor vehicle and engaged through the plate 11 are suitable cap screws for securing the casing in position. Traversing the rear end portion of the casing is a partition 12 from which extends a horizontal web 13 integral with the back wall of the casing and slidable through said partition, the front wall of the casing, and said back wall, is a plurality of horizontally disposed gear shift rods which, for convenience, have been indicated at 14, 15, 16 and 17 respectively. One of these rods is shown in detail in Figure 7 of the drawings. Depending from the rod 14 freely through the cover plate 11 is an arm 18 terminating at its lower end in a suitable fork having engagement with a speed gear and, as particularly brought out in Figures 1 and 4, the rod 17 is provided with a similar depending arm 19. The transmission gears have not been shown in connection with these arms since the manner in which the arms coact with said gears will be well understood. However, it should be noted that forward movement of the rod 14 is designed to render the high speed gear active while rearward movement of said rod is designed to render the second speed gear active. Similarly, forward movement of the rod 17 is designed to render the low speed gear active while rearward movement of this rod is designed to render the reverse gear active. At their rear end portions the rods are reduced and provided with pairs of confronting racks 20 and mounted between each pair of racks is a pinion 21. As particularly brought out in Figure 1, these pinions are carried by vertical stub shafts 22 extending between the web 13 of the casing and the cover plate 11. Thus, forward movement of the rod 15' will serve to shift the rod 14 rearwardly and, in like manner, forward movement of the rod 16 will serve to shift the rod 17 rearwardly. In the rear end portion of the rods 15 and 17 is a series of sockets 23 and mounted in the partition 12 of the casing are spring-pressed detents 24 which are each selectively engageable in the sockets of one of said series respectively. As will be observed, each series comprises three sockets, the detents being, as shown in Figure 4, engaged in the intermediate sockets of said series when the gear shift rods are in neutral position. In this position of the rods, the speed gears are, of course, also in neutral position. Upon forward movement of the rods 15 and 17 the detents will engage in the rearmost of said sockets while when said rods are shifted rearwardly, the detents will engage in the foremost of said sockets. Consequently, as will be seen, when the rods are shifted, the detents will serve to yieldably lock said rods for preventing accidental movement of the speed gears. Upstanding from the gear shift rods is a plurality of alined lugs which, for convenience, have been indicated at 25, 26, 27 and 28 respectively and in front of these lugs said rods are further provided with upstanding stop lugs 28' arranged to coact with the front wall of the casing for limiting the rods in their forward movement.

Journaled through the forward end portion of the casing is a transverse shaft 29 upon one end of which is fixed an elongated gear 30. Suitably secured to the opposite end portion of said shaft is a cam 31 and confronting this cam is a pinion 32 also fixed to the shaft. Extending transversely of the casing in the rear of the shaft 29 and parallel thereto is a shaft 33 which is squared and, at one end portion, carries an arm 34 extending beneath the shaft 29 to cooperate with the cam 31. Holding the arm in engagement with said cam is a spring 35 secured at its lower end to a pin upon the arm and at its upper end to a pin projecting from the adjacent side wall of the casing. Mounted upon the shaft 33 to turn therewith but slidable along said shaft is a neutral shift member 36. As shown in detail in Figure 5, this member comprises a pair of spaced wings which extend from a hub common to both thereof and, at the space between said wings, the hub is formed with a reduced externally cylindrical neck upon which is journaled a selector 37 formed to swing freely between said wings. At its upper end portion, the selector is provided with a gear segment 38 which is constantly in mesh with the gear 30 upon the shaft 29, this gear being of a length equal to the throw of the neutral shift member. As will now be observed upon reference to Figure 1, when the neutral shift member and the selector are in their normal positions, the wings of said member extend in advance of the lugs 25, 26, 27 and 28 upon the gear shift rods while the selector extends in the rear of said lugs, the selector being formed at its lower end to engage the lugs individually. Loose upon the shaft 33 at the outer side of the arm 34 is a gear 39 having a hub 40 journaled through the adjacent side wall of the casing and, as best shown in Figures 1 and 3, said gear is in mesh with the pinion 32, the gear and pinion being at the ratio of substantially 3 to 1. Fixed to the hub 40 of the gear is an arm 41 to which is pivotally connected a rod 42. The clutch shaft of a vehicle has been conventionally illustrated at 43, this shaft carrying the usual clutch pedal, and fixed to said shaft is an upstanding arm 44 provided with a slotted head 45 through which is engaged a pin 46 carried by the rod 42. Connected to the free end of the arm 41 is a spring 47 engaged with a suitable post extending from the adjacent side wall of the casing. This spring is, of course, provided for returning the arm to its normal position and limiting the arm in its swinging movement under the influence of said spring is a stop 48 extending from the casing in the rear of the arm.

Extending freely through the rear end wall of the casing 11 and through the partition 12, is a lever 49 journaled upon said end wall and coupled at its inner end by a slot and pin connection with a fork 50 freely engaging in a suitable groove in the adjacent end of the hub of the neutral shift member 36. Appropriately coupled at one end to the outer end of said lever is a rod 51, the opposite end of which is suitably connected to an arm 52 upon the lower end of an actuating shaft 53. As suggested in Figure 2, this shaft is preferably supported upon the steering post of the vehicle to extend upwardly along said post and at its upper end carries a crank 54 below which is positioned a suitable indicator 55 having proper characters thereon denoting the different positions of the crank for the different speeds of the vehicle transmission as well as neutral and reverse. Thus, as will be seen, the crank 54 may be operated for sliding the neutral shift member along the shaft 33 and positioning the selector 37 opposite any one of the lugs 25, 26, 27 and 28 or, as shown in Figure 3, disposing the selector laterally beyond the gear shift rod 16 in neutral position.

As will now be readily understood in view of the preceding description, after the crank 54 has been operated to set the selector for the desired speed gear, the clutch pedal of the vehicle may be depressed which will result in rocking the arm 44 forwardly so that the arm 41 will be swung and the gear 39 rotated rearwardly. Rearward rotation of this gear will cause forward rotation of the pinion 32 so that the gear 30 upon the shaft 29 will also be caused to rotate forwardly. This pinion, coacting with the gear segment 38 of the selector 37, will consequently act to swing the lower end of said selector forwardly. Assuming now that the selector has been set in position for shifting the second speed gear, it will be seen that when the selector is swung, as just described, the lower end of the selector will be moved into engagement with the lug 26 so that as the forward swinging movement of the lower end of the selector continues, the rod 15 will be moved forwardly resulting, as previously explained, in a rearward movement of the rod 14. In like manner, the selector may be set opposite any one of the lugs 25, 26, 27 and 28, for shifting the different gear shift rods and consequently shifting any gear desired. Attention is now directed to the fact that as the shaft 29 is rotated by the gear 39, the cam 31 will be swung downwardly for depressing the arm 34 and consequently rotating the shaft 33 forwardly. Forward rotation of this shaft will cause the neutral shift member 36 to be swung rearwardly coincident with the forward swinging movement imparted to the selector 37. Now, let it be assumed that the gear shift rod 15 has been moved forwardly, as just described, so that the lug 26 upon said rod lies in advance of the lugs 25, 27 and 28, and that the selector has been set for shifting the high speed gear and is consequently disposed opposite the lug 25 upon the rod 14. Thus, since the lug 26 is in advance of the other of said lugs, a wing of the neutral shift member will contact the lug 26 and, as the neutral shift member is swung rearwardly, will return the rod 15 to its original position before the selector engages the lug 25 upon the rod 14. Consequently, as will be seen, the neutral shift member will operate to return the speed gear previously active to its original or neutral position before the shifting of the gear later selected and, of course, the neutral shift member will similarly operate in connection with any previously selected gear, the combined width of the wings of said member being such that regardless of the position of the neutral shift member along the shaft 33, either one wing or the other, or portions of both of said wings, will always confront all of the lugs 25, 26, 27 and 28. In this connection it is to be noted that the cam 31 is formed to swing the selector 36 only a limited throw so that after the selector has been moved for returning any one of the gear shift rods to its original position, further swinging of said member will not occur but, on the other hand, said member will remain stationary while the selector continues in its movement for shifting the gear selected. When the selector is set in neutral position as shown in Figure 3, the neutral shift member will operate to return any previously selected gear to its original position without actuation by the selector of any other gear.

As shown in Figure 2, the pin 46 upon the rod 42 stands, when the parts are in their normal position, near one end of the slot in the head 45 of the arm 44, the clutch of the vehicle being, when the arm is in the position shown, in engagement with its drum. Accordingly, as will be appreciated, the clutch pedal of the vehicle may be depressed sufficiently to release the clutch without actuating the gear shift mechanism so that even though any one of the speed gears is active, the vehicle may be permitted to stand with the engine of the vehicle in operation. Preferably, the slot in the head 45 of the arm 44 is of such length that the clutch pedal may be depressed for half its throw without moving the arm 41 while completion of the throw of the pedal will serve to swing the arm and actuate the mechanism as previously indicated.

Having thus described the invention, what is claimed as new is:

1. A speed gear shifting mechanism including companion gear shifting means, an oscillating selector for actuating said means individually, means for returning any one of said first mentioned means to its original position, the selector being journaled on said returning means, and means for actuating the selector and said second mentioned means.

2. A speed gear shifting mechanism including companion gear shifting means, a selector for shifting said means individually, means for returning any one of the first means to its original position, means for actuating the selector, and a cam for actuating said second mentioned means operable by said last mentioned means.

3. A speed gear shifting mechanism including companion gear shifting means, a selector, means operable for setting the selector to actuate said first mentioned means individually and movable independently of the selector for returning any one of said first mentioned means to its original position, and means for actuating the selector and said second mentioned means.

4. A speed gear shifting mechanism including companion gear shifting means, a selector, means carrying the selector movable for setting the selector to coact with said first mentioned means individually and operable independently of the selector for returning any one of said first mentioned means to its original position, and means for actuating the selector and said second mentioned means.

5. A speed gear shifting mechanism including companion gear shifting means, a selector, a swinging neutral shift member operable for returning any one of said first mentioned means to its original position and swingingly supporting the selector, said member being movable endwise for setting the selector to coact with said first mentioned means individually, and means for swinging the selector and said member.

6. A speed gear shifting mechanism including companion gear shifting means, a swinging neutral shift member having spaced wings movable for returning any one of said first mentioned means to its original position, a selector mounted to swing upon said member between the wings thereof and operable for selectively shifting said first mentioned means, and means for shifting the member laterally and setting the selector to coact with said first mentioned means individually.

7. A speed gear shifting mechanism including companion gear shifting means, a selector swingingly movable in one direction for actuating said means individually, a neutral shift member swingingly movable in the opposite direction for returning any one of said means to its original position, said member journaling the selector, and means for swinging the selector and said member in opposite directions simultaneously.

8. A speed gear shifting mechanism including companion gear shifting means, a selector swingingly movable in one direction for shifting said means individually, a neutral shift member swingingly movable in the opposite direction for returning any one of said means to its original position and swingingly supporting the selector, means for shifting said member laterally and setting the selector to coact with said first mentioned means individually, and means for swinging the selector and said member in opposite directions simultaneously.

9. A speed gear shifting mechanism including companion gear shifting means, a rotatable shaft, a neutral shift member carried by the shaft to turn therewith and operable for returning any one of said means to its original position, a selector carried by said member and operable for shifting said means, means for shifting the member along the shaft and setting the selector to coact with said first mentioned means individually, and means for rotating the shaft and actuating said selector.

10. A speed gear shifting mechanism including companion gear shifting means, a rotatable shaft, a neutral shift member carried by the shaft to turn therewith and movable in one direction for returning any one of said means to its original position, a selector swingingly carried by said member and movable in the opposite direction for shifting said means, means for shifting said member along the shaft and setting the selector to coact with said first mentioned means individually, means for rotating the shaft, and means coupling the selector with the shaft whereby the selector will be simultaneously swung in a direction opposite to the movement of said member.

11. A speed gear shifting mechanism including companion gear shifting means, a rotatable shaft, a neutral shift member carried by the shaft to turn therewith and operable for returning any one of said means to its original position, a selector mounted to swing upon said member and operable for shifting said means, means for shifting the member along the shaft and setting the selector to coact with said first mentioned means individually, a countershaft, means carried by the countershaft constantly in engagement with the selector whereby the selector will be swung when the countershaft is rotated, means for rotating the countershaft, and means for rotating the first shaft by the countershaft.

12. A speed gear shifting mechanism including companion gear shifting means, a swingingly neutral shift member operable for returning any one of said means to its original position, a swinging selector carried by said member and operable for shifting said means, means for moving the member laterally and setting the selector to coact with said first mentioned means individually, and means constantly in engagement with the selector for swinging the selector when said member is swung.

13. A speed gear shifting mechanism including companion gear shifting means, a rotatable shaft, a selector mounted upon the shaft to turn therewith and operable for returning any one of said means to its original position, a swinging selector carried by the member and operable for shifting said means, means for moving the member along the shaft and setting the selector to coact with said first mentioned means individually, the selector being provided with gear teeth, a countershaft, a gear carried by the countershaft constantly in engagement with the teeth of the selector, means for rotating the countershaft, a cam upon the countershaft, and an arm carried by the first shaft to coact with said cam whereby the first shaft will be turned when the countershaft is rotated.

14. A speed gear shifting mechanism including companion gear shifting means, a selector, means slidable for setting the selector to coact with said first mentioned means individually and swingingly movable for returning any one of said first means to its original position, and means for actuating the selector and said second mentioned means independently of each other.

15. A speed gear shifting mechanism including companion gear shifting means, a selector, slidably supported oscillating means journaling the selector, the latter means being slidable for setting the selector to coact with said first mentioned means individually and being adapted to be rocked for returning any one of said first mentioned means to its original position, and means for actuating the selector and said second mentioned means.

In testimony whereof I affix my signature.

GLENN T. RANDOL. [L. S.]